(12) United States Patent
Numata

(10) Patent No.: US 11,805,334 B2
(45) Date of Patent: Oct. 31, 2023

(54) APPARATUS AND METHOD FOR INFORMATION PROCESSING AND STORAGE MEDIUM

(71) Applicant: CANON KABUSHIKI KAISHA, Tokyo (JP)

(72) Inventor: Aihiko Numata, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 79 days.

(21) Appl. No.: 17/512,422

(22) Filed: Oct. 27, 2021

(65) Prior Publication Data

US 2022/0150435 A1 May 12, 2022

(30) Foreign Application Priority Data

Nov. 9, 2020 (JP) ................................ 2020-186564

(51) Int. Cl.
| | |
|---|---|
| *H04N 1/00* | (2006.01) |
| *H04N 23/80* | (2023.01) |
| *H04N 25/75* | (2023.01) |
| *H04N 25/47* | (2023.01) |
| *H04N 25/77* | (2023.01) |
| *H04N 25/53* | (2023.01) |
| *H04N 25/443* | (2023.01) |

(Continued)

(52) U.S. Cl.
CPC ......... *H04N 25/77* (2023.01); *H04N 1/00411* (2013.01); *H04N 1/00413* (2013.01); *H04N 1/00458* (2013.01); *H04N 23/80* (2023.01); *H04N 25/443* (2023.01); *H04N 25/47* (2023.01); *H04N 25/53* (2023.01); *H04N 25/745* (2023.01); *H04N 25/75* (2023.01); *H04N 2101/00* (2013.01)

(58) Field of Classification Search
CPC ........... H04N 1/00411; H04N 1/00413; H04N 1/00458; H04N 23/80; H04N 25/40; H04N 25/443; H04N 25/47; H04N 25/50; H04N 25/53; H04N 25/745; H04N 25/75; H04N 25/76; H04N 25/77; H04N 2101/00
See application file for complete search history.

(56) References Cited

U.S. PATENT DOCUMENTS

2004/0046887 A1* 3/2004 Ikehata .................. H04N 5/772
348/333.12
2019/0289230 A1* 9/2019 Berner ................. H04N 25/745
(Continued)

FOREIGN PATENT DOCUMENTS

JP 2019134271 A 8/2019

*Primary Examiner* — Lin Ye
*Assistant Examiner* — Chriss S Yoder, III
(74) *Attorney, Agent, or Firm* — CANON U.S.A., INC. IP Division

(57) ABSTRACT

An apparatus includes an acquisition unit configured to obtain a signal indicating an address of a pixel in which a change in luminance has occurred and time of the change and a generation unit configured to generate a time-series image indicating a position of at least one pixel in which a change in luminance has occurred and a direction of the change in luminance based on the signal, wherein, when the time-series image is to be displayed in reverse chronological order, the generation unit generates the time-series image in which the direction of the change in luminance is reversed.

20 Claims, 11 Drawing Sheets

(51) Int. Cl.
 *H04N 25/71* (2023.01)
 *H04N 101/00* (2006.01)

(56) References Cited

U.S. PATENT DOCUMENTS

2020/0351455 A1* 11/2020 Niwa .................... H04N 25/53
2022/0038645 A1* 2/2022 Takahashi ............. H04N 25/47

* cited by examiner

APPARATUS AND METHOD FOR INFORMATION PROCESSING AND STORAGE MEDIUM

BACKGROUND OF THE DISCLOSURE

Field of the Disclosure

The aspect of the embodiments relates to display of event base sensors.

Description of the Related Art

There is a known event base sensor that outputs a change in luminance of each pixel in real time using an address event signal (see Japanese Patent Laid-Open No. 2019-134271).

SUMMARY OF THE DISCLOSURE

An apparatus according to an aspect of the embodiments includes an acquisition unit configured to obtain a signal indicating an address of a pixel in which a change in luminance has occurred and time of the change and a generation unit configured to generate a time-series image indicating a position of at least one pixel in which a change in luminance has occurred and a direction of the change in luminance based on the signal, wherein, when the time-series image is to be displayed in reverse chronological order, the generation unit generates the time-series image in which the direction of the change in luminance is reversed.

Further features of the disclosure will become apparent from the following description of exemplary embodiments with reference to the attached drawings.

DESCRIPTION OF THE EMBODIMENTS

Information processing apparatuses according to embodiments of the disclosure will be described hereinbelow with reference to the drawings. Components having the same function in all the drawings are denoted by the same reference signs, and descriptions thereof will be omitted.

First Embodiment

The following is a description on an information processing apparatus including an event base sensor that displays an image generated from an address event signal indicating the address of a pixel where a change in luminance has occurred and the time of the change. In particular, a method of display using a three-dimensional coordinate space constituted by the coordinates (XY) of a pixel in which an event has occurred and an axis (T) indicating the time (T) when a change in luminance has occurred (hereinafter referred to as "XYT display") will be described.

<Information Processing Apparatus>

Figure 1:
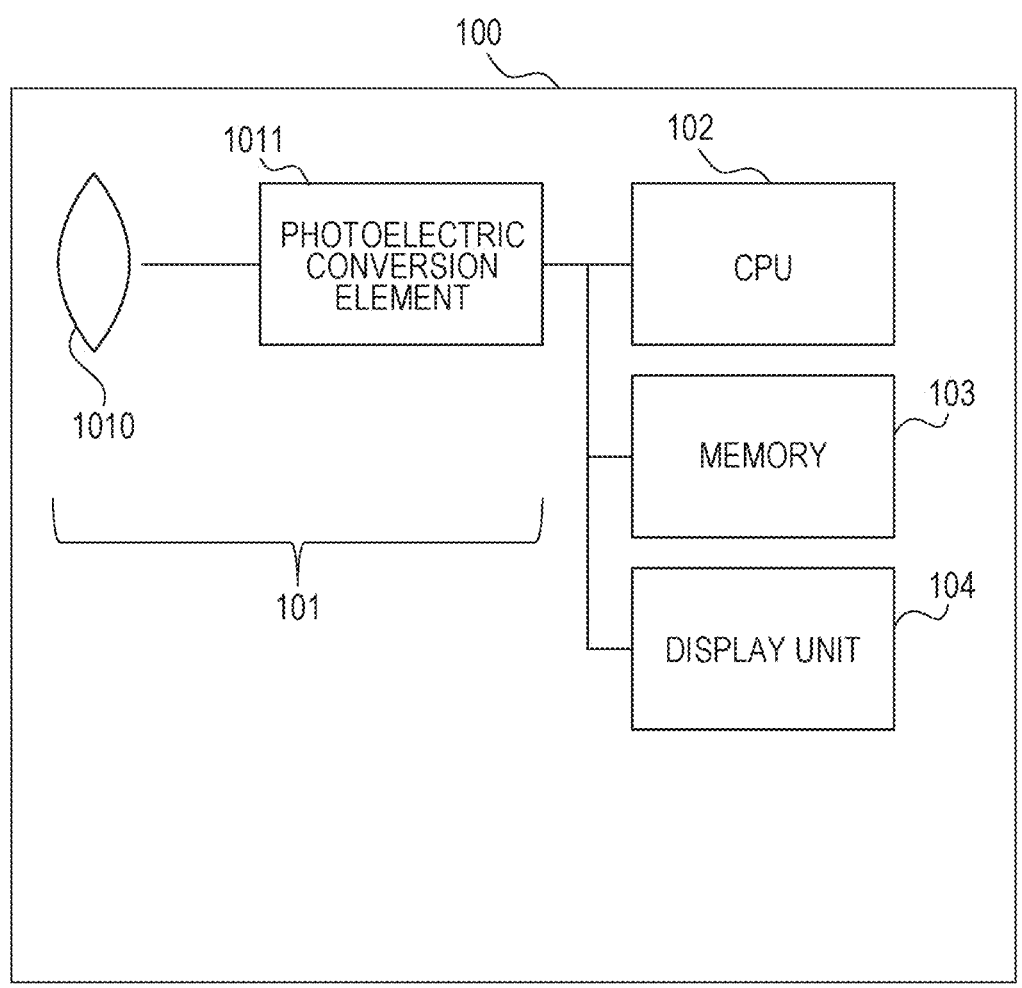
FIG. 1 is a block diagram illustrating an example of the hardware configuration of an information processing apparatus.

FIG. 1 is a block diagram of an example of the hardware configuration of the information processing apparatus. In FIG. 1, the information processing apparatus 100 includes an image capturing unit 101 including an imaging optical system 1010 and a photoelectric conversion element 1011, a central processing unit (CPU) 102, a memory 103, and a display unit 104. The image capturing unit 101 outputs an address event signal according to received incident light. The imaging optical system 1010 is specifically a light receiving lens, and receives incident light and forms an image on the photoelectric conversion element 1011. The photoelectric conversion element 1011 is specifically a single photon avalanche diode (SPAD) sensor or a complementary metal oxide semiconductor (CMOS) sensor and outputs an address event signal according to the received incident light. The CPU 102 reads an operating system (OS) or other programs stored in the memory 103 and executes them to control connected components to perform, for example, calculation of various processes and logical determination. The processes that the CPU 102 executes include information processing according to this embodiment. The CPU 102 also controls the focusing and aperture driving of the imaging optical system 1010 and driving of the photoelectric conversion element 1011. Examples of the memory 103 include a hard disk drive and an external storage, which store programs and various data on the information processing of the embodiment. The display unit 104 performs XYT display according to various information and the address event signal.

Figure 2:
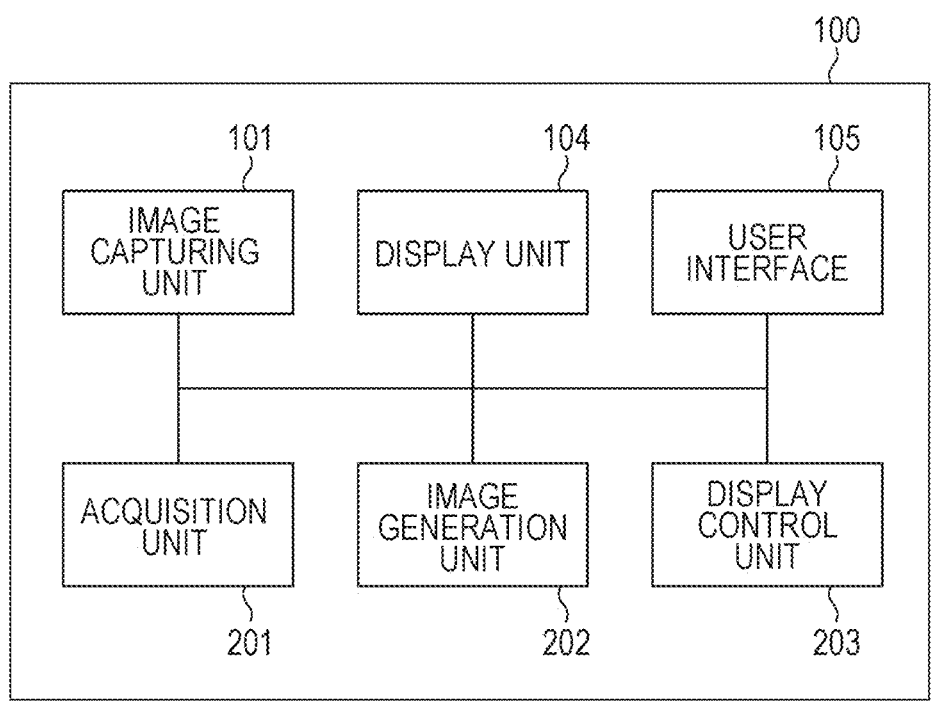
FIG. 2 is a block diagram illustrating an example of the functional configuration of the information processing apparatus.

Referring next to FIG. 2, an example of the functional configuration of the information processing apparatus 100 according to this embodiment will be described. The information processing apparatus 100 includes the image capturing unit 101, an acquisition unit 201, an image generation unit 202, a display control unit 203, the display unit 104, and a user interface (an operation unit) 105. The image capturing unit 101 outputs an address event signal according to the received incident light. More specifically, the image capturing unit 101 outputs an address event signal indicating the address of a pixel where a change in luminance occurred and the time of the change. The acquisition unit 201 obtains the address event signal output from the event base sensor. The address event signal includes information on the position of a pixel (or a set of pixels) where a change in luminance occurred in a predetermined time range, the direction of the change in luminance, and the time when the change (event) in luminance occurred. The image generation unit 202 generate a time-series image indicating the position of at least one pixel where a change in luminance occurred in a predetermined time range and the direction of the change in luminance. In other words, the image generation unit 202 generates an XYT image from the address event signal. When displaying the image in reverse chronological order, the display control unit 203 reverses the direction of the change in luminance of the generated image. When displaying the image in reverse chronological order, the display unit 104 displays an image in which the direction of the change in luminance is reversed. For example, the display unit 104 may be a device outside the information processing apparatus 100, for example, a display or a projector. The user interface 105 receives various instructions on image capturing, display, and so on input by the user. The user interface 105 may be an external device separate from the information processing apparatus 100. The functional configuration of the information processing apparatus 100 may include a configuration other than those described here.

<Event Base Sensor>

Figure 3A:
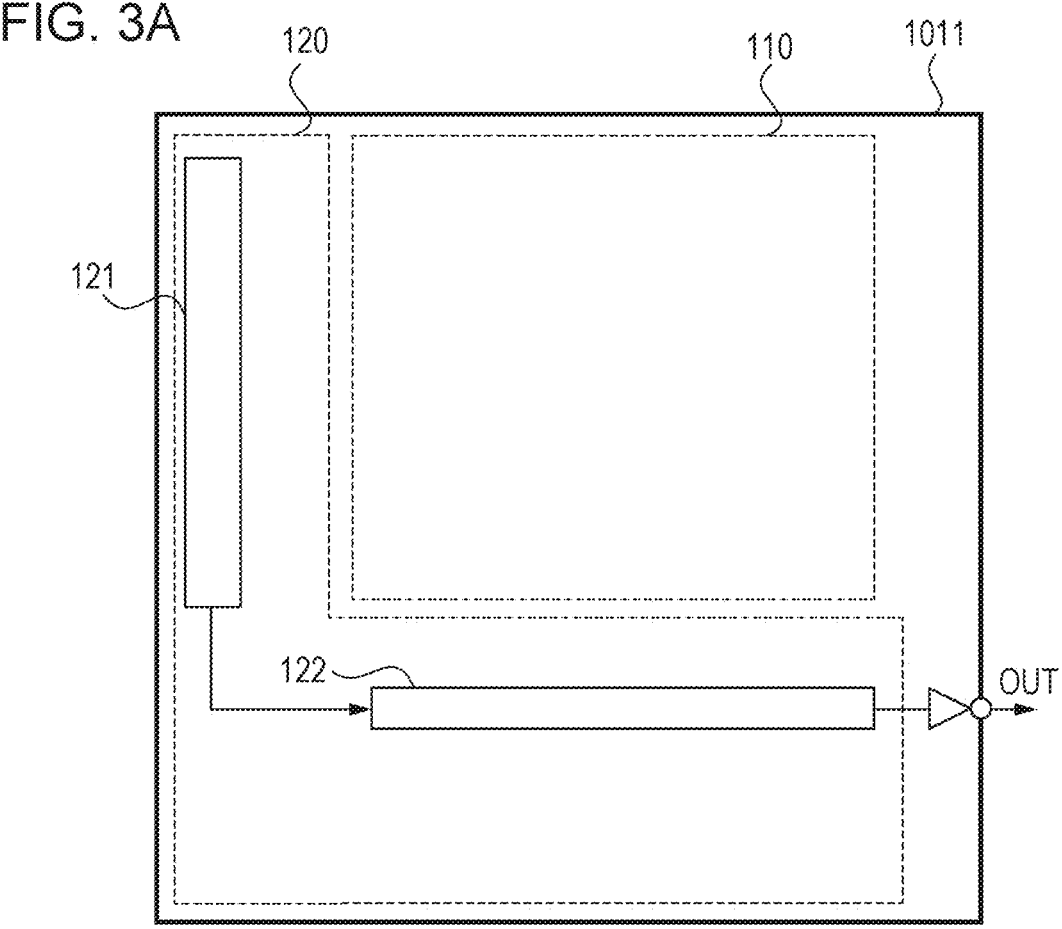
FIG. 3A is a diagram illustrating an example of the configuration of an event base sensor.

An example of the event base sensor according to this embodiment will be described. The event base sensor counts the number of incident photons and determines the timing at which the number of the counted photons exceeded a predetermined threshold. The event base sensor measures the time (clocks) required until the number of photons reached a first threshold or greater and detects a change in luminance by comparing the required times. Specifically, if the difference T−T0 between the last-measured required time T0 and the latest required time T is a second threshold or greater, the event base sensor detects a change in luminance in the minus direction. If the difference T0−T is the second threshold or greater, the event base sensor detects a change in luminance in the plus direction. If the difference between T and T0 is less than the second threshold, the event base sensor does not detect a change in luminance. The second threshold is a value equal to or greater than zero, for example, a preset value or a value that is set according to another parameter. The detailed configuration will be described hereinbelow. FIG. 3A is a diagram illustrating an example configuration of the photoelectric conversion element 1011.

The photoelectric conversion element 1011 includes a pixel unit 110 and a peripheral circuit 120. The peripheral circuit 120 includes a vertical adjustment circuit 121 and a horizontal readout circuit 122.

Figure 3B:
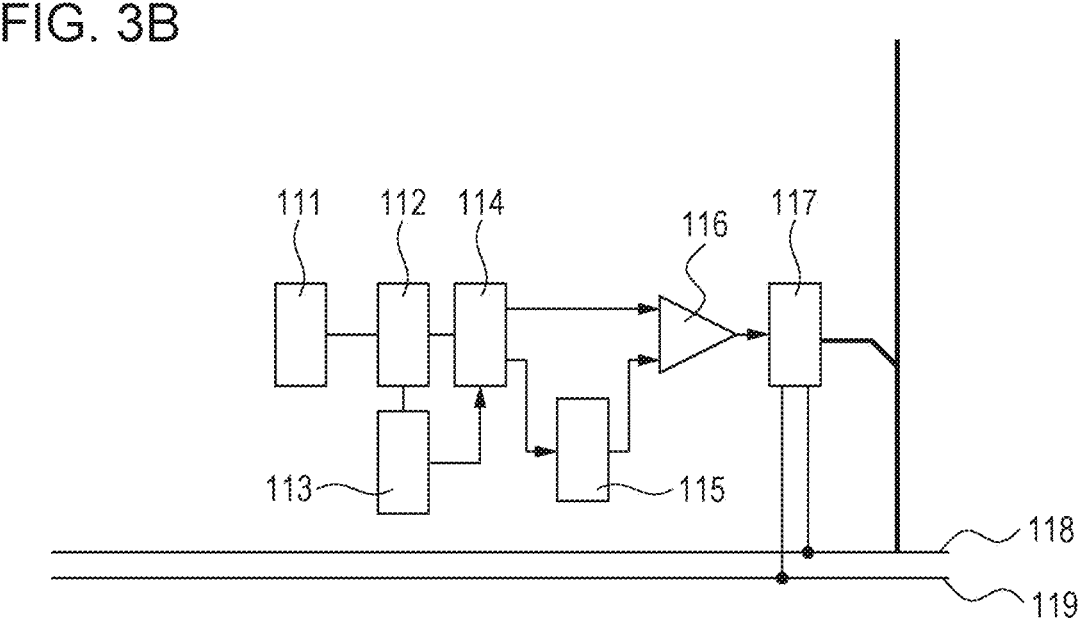
FIG. 3B is a diagram illustrating an example of the configuration of the event base sensor.

FIG. 3B is a diagram illustrating an example configuration of each pixel unit 110 of the event base sensor. The pixel unit 110 includes a photoelectric conversion unit 111, a pixel counter 112, a time counter 113, a first determination circuit 114, a memory 115, a comparator 116, a second determination circuit 117, a response circuit 118, and a selection circuit 119.

The photoelectric conversion unit 111 includes a single photon avalanche diode (SPAD) that operates in Geiger mode and counts the number of photons incident on the photoelectric conversion unit 111 with the pixel counter 112. The time counter 113 counts the time when photons are incident on the photoelectric conversion unit 111. The event base sensor including the SPAD can detect a change in luminance in the order of a photon. Detecting a change in luminance per photon allows an address event signal to be given even in night vision, such as at nighttime.

When the number of photons counted by the pixel counter 112 reaches the first threshold, the first determination circuit 114 stops the time count with the time counter 113. The memory 115 stores past values counted by the time counter 113. The difference between the present count value of the time counter 113 and the past count value of the time counter 113 is obtained with the comparator 116.

If the value of the difference is the second threshold or greater, the second determination circuit 117 sends a request signal to the vertical adjustment circuit 121 via the response circuit 118. The response circuit 118 receives a response indicating whether to permit output of address event data from the vertical adjustment circuit 121. If the difference count value is less than the second threshold, the second determination circuit 117 sends no request signal.

When the response circuit 118 receives a response indicating permission of the output, the selection circuit 119 outputs the count value of the time counter 113 to the horizontal readout circuit 122. The horizontal readout circuit 122 outputs the received count value as an output signal to a detection unit from the photoelectric conversion element 1011.

Since the differential count value calculated by the comparator 116 corresponds to the reciprocal of the photon incident frequency, the photoelectric conversion element 1011 of the disclosure has the function of measuring "a change in photon incident frequency", that is, a change in luminance. Only when the difference in the interval of the time when the number of incident photons reached the first threshold, determined by the second determination circuit 117, is the second threshold or greater, the photoelectric conversion element 1011 outputs the address event signal. In other words, if the difference in incident frequency is large, the photoelectric conversion element 1011 outputs the incident frequency, and if the difference is small, the photoelectric conversion element 1011 does not output the incident frequency. The above configuration provides an asynchronous photoelectric conversion element that detects a change in luminance as an address event for each pixel address in real time.

<Variations of Photoelectric Conversion Element>

The foregoing illustrates a photoelectric conversion element that detects a change in photon incident frequency by measuring the time when photons enter using the SPAD for the photoelectric conversion unit 111. However, the configuration in FIG. 2 is given for mere illustrative purposes. Any asynchronous photoelectric conversion element that detects changes in luminance as address events in real time may be used. For example, a photoelectric conversion element that detects a change in luminance as a voltage change may be used, as in Japanese Patent Laid-Open No. 2019-134271.

<Image Generation Unit>

The image generation unit 202 generates a time-series image indicating the position of at least one pixel where a change in luminance occurred in a predetermined time range and the direction of the change in luminance according to a given address event signal. Specifically, the image generation unit 202 rearranges the information on the luminance change detected by the event base sensor to a raster scan format, which is easy for the display unit 104 to display. In other words, the image generation unit 202 generate an XYZ image by converting the address event signal to a coordinate space constituted by T-axis (first axis) indicating the time axis and XY axes (second axes) related to space.

The order of signal output from the photoelectric conversion element 1011 is controlled by the vertical adjustment circuit 121 in the photoelectric conversion element 1011, as described above. The signals are output in the order in which a change in luminance equal to or greater than the threshold occurred (in time-series). For that reason, unlike synchronous photoelectric conversion elements, such as common CMOS image sensors, the order of output from the pixels is not in the raster-scan frame format. The image generation unit 202 therefore temporarily stores signals output from the photoelectric conversion element 1011 in a specific time range in the memory 103 and thereafter rearranges the signals for each pixel address to convert them into a raster scan frame format. Repeating this conversion multiple times allows for generating an XYT image having multiple frame images (XY images) in the temporal direction (T-direction).

If the phenomenon is to be displayed in real time, the reciprocal of the refresh rate of the display unit 104 is used for the specific time range. If a high-speed change of the subject is to be displayed in slow motion, the specific time is decreased according to the display speed. Specification from the user may be input and set via the user interface 105.

<Display Unit>

Figure 4A:
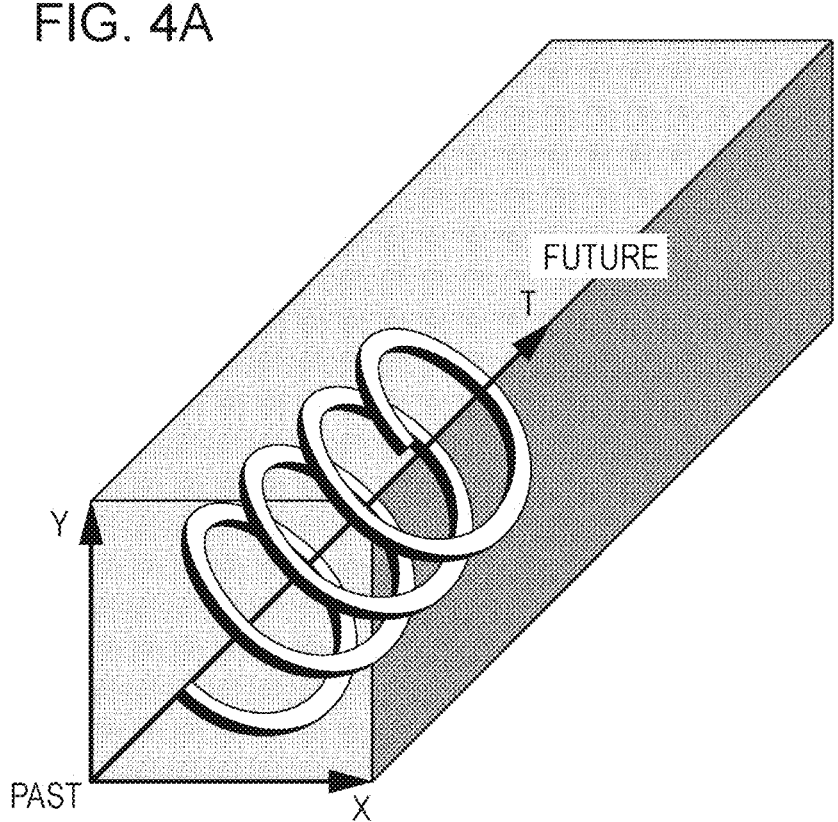
FIG. 4A is a diagram illustrating an example of display.

The display unit 104 displays the coordinates of the pixel where a change in luminance occurred and the time of change in three dimensions. FIG. 4A illustrates an example of the XYT image displayed by the display unit 104. White indicates that the luminance has changed in the plus direction, black indicates that the luminance has changed in the minus direction, and gray indicates that the luminance has not changed (or less than a threshold).

<Flowchart>

Figure 10:
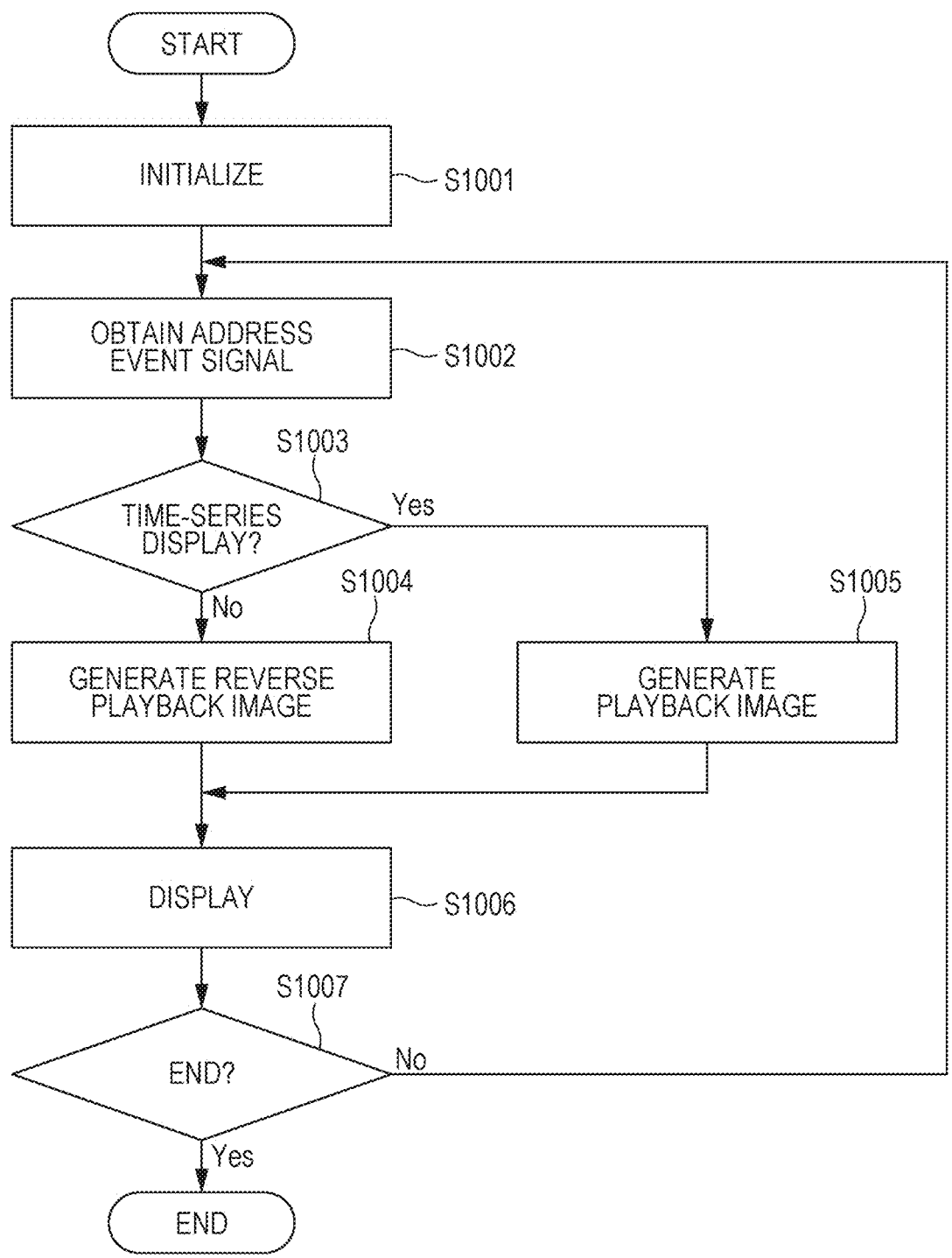
FIG. 10 is a flowchart illustrating processing executed by the information processing apparatus.

Processing that the information processing apparatus 100 executes to display the address event signal described above will be described. FIG. 10 is a flowchart illustrating the processing executed by the information processing apparatus 100. The processing illustrated in the flowchart of FIG. 10 is executed by the CPU 102, which is a computer, according to a computer program stored in the memory 103. Expression of the operations (steps) is omitted in the following description by expressing each step as S at its head. The information processing apparatus 100 does not need to perform all of the steps of the flowchart.

At S1001, the information processing apparatus 100 initializes various settings. For example, the information processing apparatus 100 sets the time range when measuring the number of times of occurrence of a change in luminance. The information processing apparatus 100 also sets a threshold according to photon count noise. For example, the information processing apparatus 100 obtains the result of measurement of a change in luminance, without moving object in the monitored area to obtain a values at which an address event signal is observed. Since the observed address event signal is likely to be noise, the number of times of generation of noise is set as a threshold. Another method for setting the threshold may be employed. Any value may be set by the user. Next at S1002, the acquisition unit 201 obtains the address event signal output from the event base sensor. The address event signal includes the address of a pixel where a change in luminance occurred, the direction of the change in luminance, and time information with which the time when the luminance changed can be specified. At S1003, the display control unit 203 determines whether to display the address event signal in chronological order or in reverse chronological order. Here, the determination is made on the basis of whether the display method input to the user interface 105 by the user is a method in chronological order. The determination on the display method may be based on a preset display method.

For example, the time series may be switched between the forward direction and the reverse direction every predetermined time. If the display control unit 203 determines to display the address event signal in chronological order, the processing proceeds to S1005, and if not, the processing proceeds to S1004. At S1004, the image generation unit 202 generates a reverse time-series image indicating the position of at least one pixel where a change in luminance occurred and the direction of the change in luminance. In this case, to display the image in reverse chronological order, the image generation unit 202 generates an image in which the direction of the change in luminance that the obtained address event signal indicates is reversed. When address event signals are accumulated to some extent, the image generation unit 202 adds up changes in luminance in a specific time range for each pixel. For a change in luminance, the direction of the change in the plus direction or the minus direction and the amount of change are determined. For reverse chronological display, the image generation unit 202 generates an image after converting the direction of the change in luminance, from the plus direction to the minus direction or from the minus direction to the plus direction, with the amount of change in luminance kept. At S1005, the image generation unit 202 generates a time-series image indicating the position of at least one pixel where a change in luminance occurred and the direction of the change in luminance on the basis of the address event signal. In this case, for display in the forward direction on the time axis, the image generation unit 202 generates the image, with the direction of the change in luminance unchanged. At S1006, the display control unit 203 displays the generated image on the display unit 104 in a set time-series. At S1007, the information processing apparatus 100 determines whether to terminate the processing. The determination of the termination may be made on the basis of user's termination instruction or depending on whether all preset processing objects have been processed. If No, the processing returns to S1002.

<User Interface>

Figure 11:
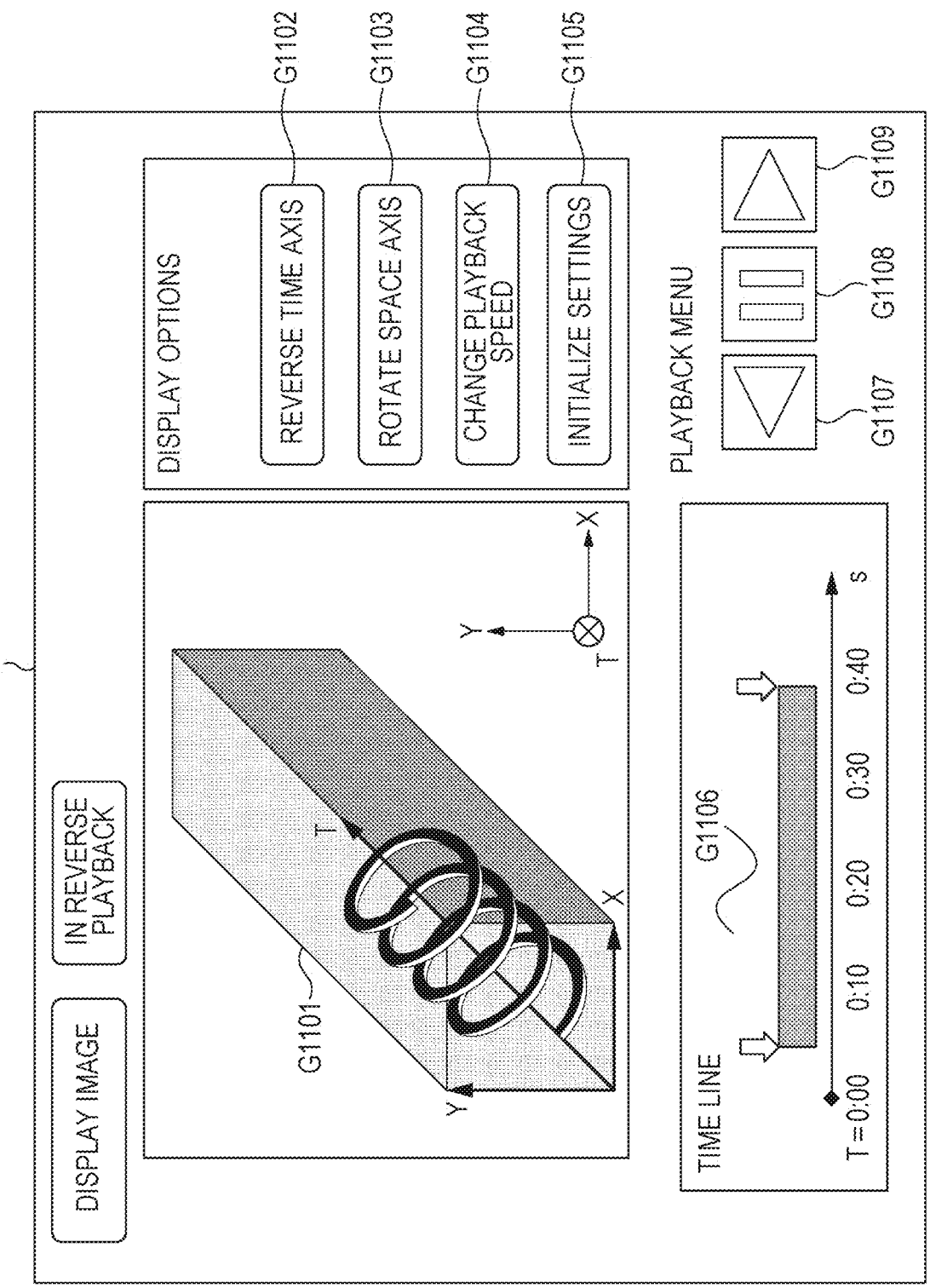
FIG. 11 is a diagram illustrating an example of a user interface.

The user interface 105 is used by the user to control the information processing apparatus 100. Specifically, the user interface 105 has functions of switching the look-down direction of the XYT image as in FIG. 4B, scaling up and down the axes of the XYT image, and clipping and displaying part of the XYT image. In particular, the user interface 105 of the disclosure has the function of switching the playback direction of the XYT image displayed on the display unit 104 between the forward direction (the direction in which time goes) and the reverse direction (the direction in which time goes back). FIG. 11 illustrates an example of the user interface 105. Reference sign G1100 denotes a graphic user interface (GUI). The user can control display of the address event signal on the screen of the GUI using a touch panel or various input devices. The GUI displays "During Playback" or "During Reverse Playback" on the screen to show the user how the image is displayed. G1101 denotes a screen that displays an image based on the address event signal according to this embodiment. In this case, the address event signal is plotted on the XYT-axes three-dimensional coordinate space. The image may be displayed with the axes rotated, or an image generated at each point in time may be displayed. G1102 denotes a button for changing the time axis to the opposite side or this side of the viewpoint. G1103 denotes a button for rotating the space axes XY. G1104 denotes a button for adjusting the playback speed of the generated image. G1105 denotes a button for initializing various settings. G1106 denotes a user interface (UI) for specifying the time range of the displayed image. The user can specify the start point and the end point to generate an image. G1107 denotes a reverse play button. This button is selected when an image is to be displayed, with the time axis reversed. G1108 denotes a pause button. G1109 denotes a play button. This button is selected when an image is to be displayed in the forward direction on the time axis. The GUI is not limited to the above. The display unit 104 and the user interface 105 may be provided at an external device connected to the information processing apparatus 100 with a network cable or radio transmission.

<Beneficial Effects>

Figure 9A:
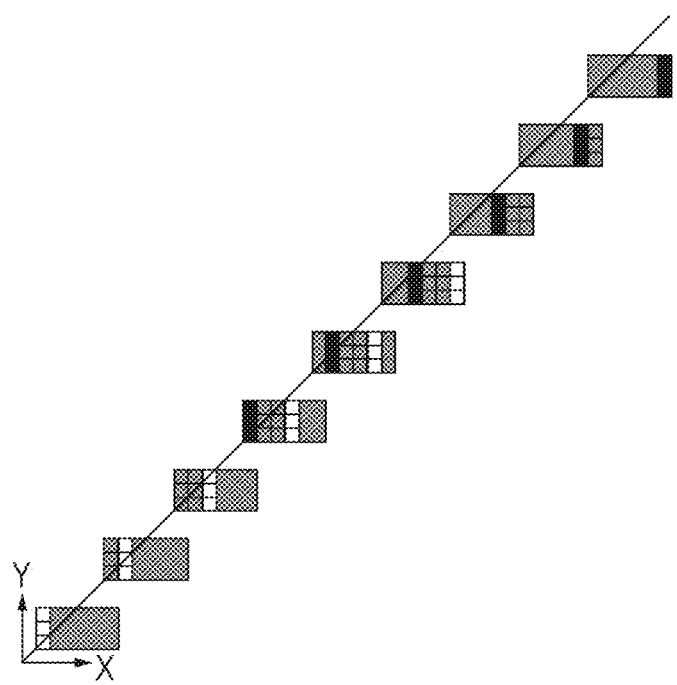
FIG. 9A is a diagram illustrating an example of display.
Figure 9B:
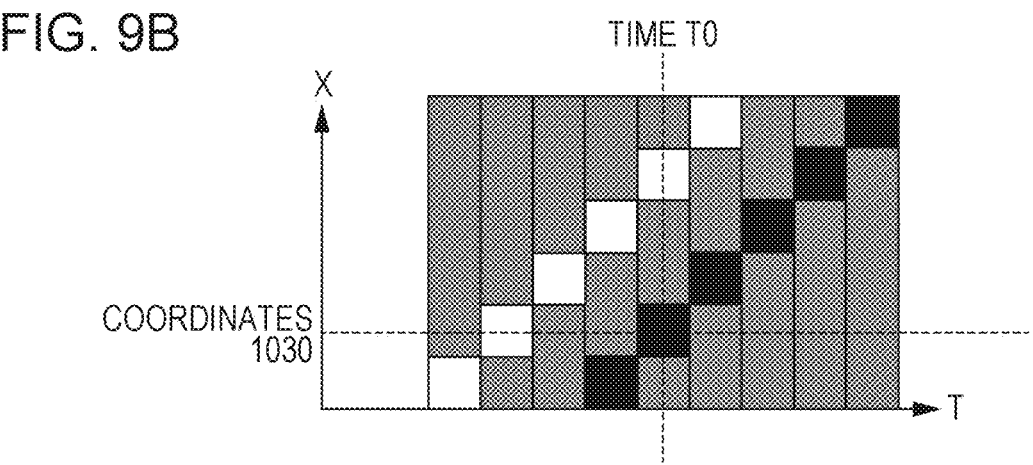
FIG. 9B is a diagram illustrating an example of display.
Figure 9C:
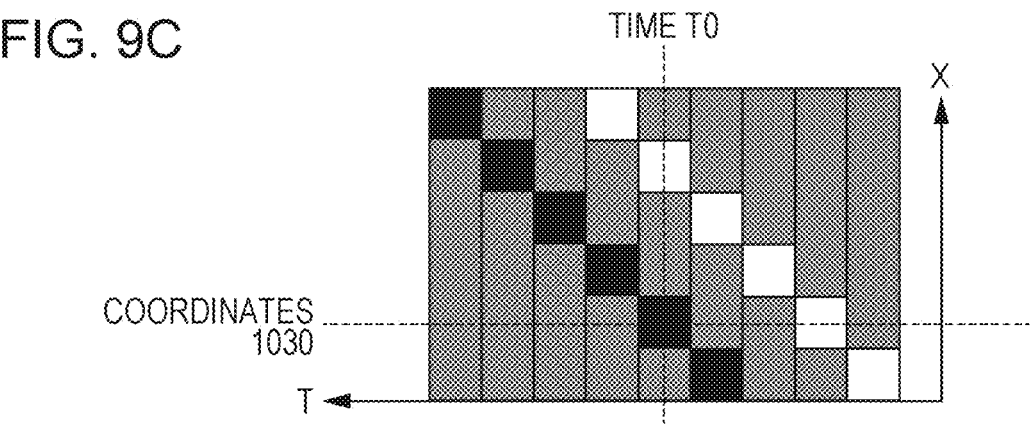
FIG. 9C is a diagram illustrating an example of display.

The information processing apparatus 100 according to this embodiment plays back an XYT image in the reverse direction, with the luminance change of each pixel reversed. This display increases the possibility that the user can correctly recognize the phenomenon occurring in a use case of detecting abnormalities of a subject moving periodically at high speed. For example, FIG. 9C illustrates an image obtained by rearranging the frame images in FIG. 9B, which are forward playback images, in the reverse direction. The coordinates 1030 in FIG. 9B are displayed in black at time T0. This shows that the luminance changed in the minus direction at time T. When the actual change in luminance is played back in the reverse direction, the luminance changes in the plus direction by the threshold or greater at time T. However, FIG. 9C shows a phenomenon in which the luminance has changed by the threshold or greater in the minus direction because the coordinates 1030 are displayed in black at time T0. In other words, the change in luminance expressed in FIG. 9B is not played back correctly in the reverse direction. Accordingly, the direction of the change in luminance seems to be the same between the case of chronological playback of the image and the case of reverse chronological playback of the image. This causes a phenomenon in which a change different from the actual change is displayed during the reverse playback.

Figure 4B:
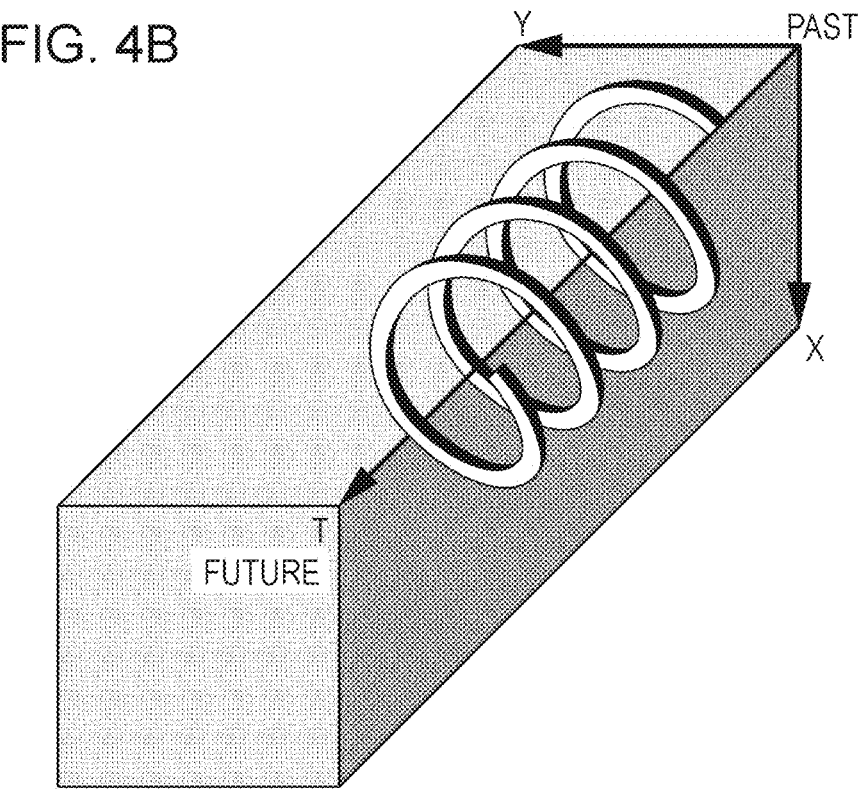
FIG. 4B is a diagram illustrating an example of display.
Figure 5A:
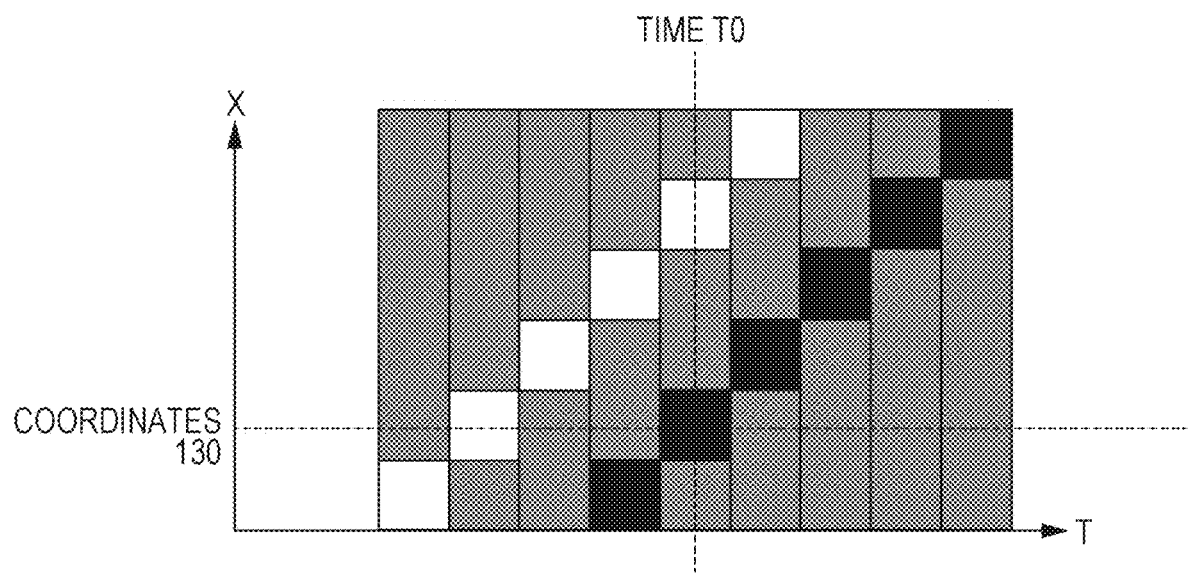
FIG. 5A is a diagram illustrating an example of display.
Figure 5B:
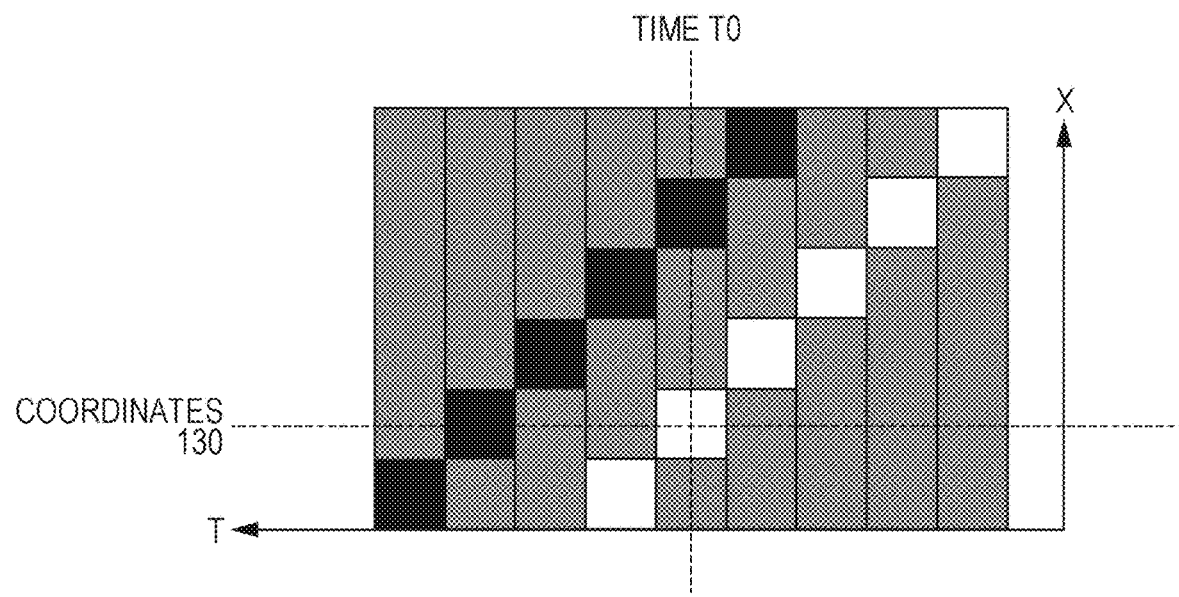
FIG. 5B is a diagram illustrating an example of display.

FIGS. 4A and 4B illustrate a forward playback image and a reverse playback image according to this embodiment, respectively. FIG. 5A illustrates a cross section of the XYT image in FIG. 9A taken along Y=0, as in FIG. 9B. FIG. 5B illustrates a reverse playback image obtained by converting the forward playback image in FIG. 5A using the method of this embodiment.

The reverse playback image according to this embodiment in FIG. 5B reversely displays the direction of the change in luminance of each frame in FIG. 5A. In other words, the pixels expressed in white in FIG. 5A are converted to black in FIG. 5B, and the pixels expressed in black in FIG. 5A are converted to while in FIG. 5B.

Coordinates 130 in FIG. 5A, which correspond to the coordinates 1030 in FIG. 9B, will be discussed. FIG. 5A and FIG. 9B illustrate the same playback image. The coordinates 130 in FIG. 5A are expressed in black at time T0, which shows that the luminance has changed in the minus direction at time T0. In other words, if the actual change in luminance is played back in the reverse direction, the luminance will change in the plus direction at time T. In contrast, the coordinates 130 in FIG. 5B are expressed in white at time T0, which shows that the luminance has changed in the plus direction at time T0. In other words, the reverse playback image in FIG. 5B is a correct reverse playback image of the forward playback image in FIG. 5A.

<Displaying Playback Direction>

Whether Forward Playback or reverse playback may be displayed on the display using character information.

<Use Case>

A conceivable example is a case in which an information processing apparatus including the event base sensor detects the occurrence of an abnormality of a subject that periodically moves at high speed, such as an assembly robot in a factory. In such a use case, the user specifies the time zone where an abnormality of the subject, such as disturbance of the periodic movement, may have occurred by viewing the XYT image. Next, to analyze the time zone where the abnormality may have occurred, the user determines whether an abnormality has occurred and specifies its cause while repeatedly playing back the XYT image in the forward direction (the direction in which time goes) and in the reverse direction (the direction in which time goes back). Thus, in playing back the XYT image in the reverse direction, the change in luminance of each pixel is reversely displayed. Such display increases the possibility that the user can correctly recognize the occurring phenomenon in a use case of detecting the abnormality of a subject that moves periodically at high speed.

Second Embodiment

<Changing Display at Reverse Playback>

An information processing apparatus 100 according to a second embodiment differs in the XYT image displayed at reverse playback. Specifically, since display of the XYT image suitable for forward playback and display of the XYT image suitable for reverse playback differ, an XYT image different from that for forward playback is displayed for reverse playback.

<Changing Viewpoint for Time Axis>

Figure 6A:
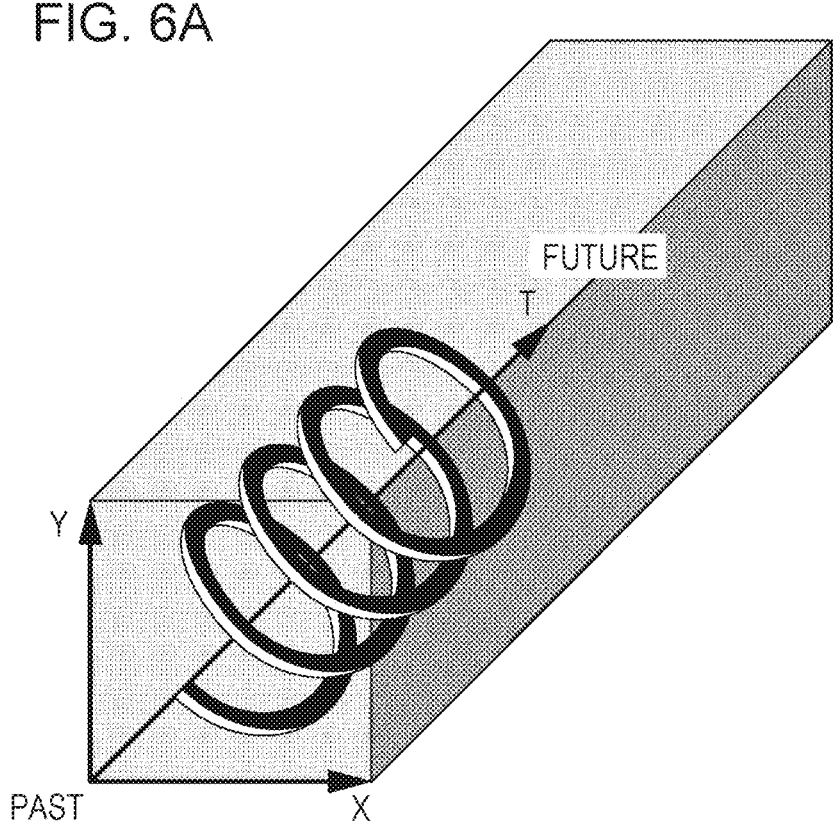
FIG. 6A is a diagram illustrating an example of display.
Figure 6B:
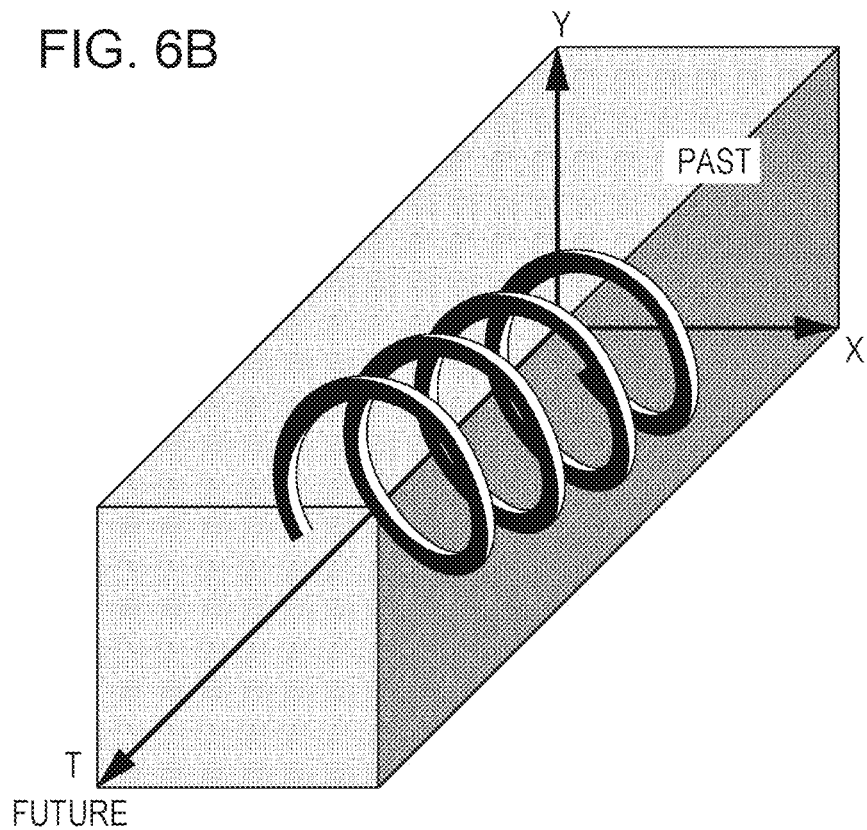
FIG. 6B is a diagram illustrating an example of display.

In displaying an image in which an address event signal is plotted in a coordinate space constituted by a first axis indicating the time axis and second axes related to space, the positions of the origin and the axes may be changed according to the method of display. FIGS. 6A and 6B illustrate images obtained by playing back the XYT image in FIG. 4A in the reverse direction. FIG. 6A is an XYT image viewed from the same viewpoint as in FIG. 4A. FIG. 6B is an XYT image in which the origin of the coordinates is changed so that the direction of T-axis (time axis) is opposite to that of FIG. 6A. As is seen in the drawings, in FIGS. 4A and 6A, the past is displayed closer to the viewer, and the future farther from the viewer, while in FIG. 6B, the past is displayed farther from the viewer, and the future closer to the viewer.

In reverse playback, an abnormality in the phenomenon that occurs in the future is often presumed retroactively. For this reason, not an XYT image in which the past is displayed on this side, as in FIG. 6A, an XYT image in which the future is displayed on this side, as in FIG. 6B, may be displayed for reverse playback. Accordingly, at reverse playback, the information processing apparatus 100 of the second embodiment displays an XYT image in which the viewpoint is changed to the opposite direction about the time axis from the direction at forward playback. Thus, for reverse playback, displaying an XYT image different from that for forward playback improves the visibility for the user.

<Changing Viewpoint for Space Axes>

By changing the viewpoint in the opposite direction from that for forward playback for the space axes (X-axis and Y-axis), in addition to the time axis, allows for display in which the past is displayed farther from the viewer, and the future closer to the viewer at reverse playback. However, the viewpoint may be reversed only for the time axis without changing the viewpoint for the space axes. This is because this makes it easy to associate the XYT image at forward playback with the XYT image at reverse playback, thereby allowing for comfort display in searching for the cause of the abnormality while repeating forward playback and reverse playback.

<Clipping from XYT Image

Another example is a use case in which part of the XYT image is to be clipped for display. For example, if the occurrence of a phenomenon different from those before and after a specific time is presumed from the XYT image, only the area around the specific time is to be extracted for display. There are two conceivable methods of display for this case. One is common moving-image display in which a frame format (XY image) that displays information on the distribution of changes in luminance in a two-dimensional coordinate space at some point in time is continuously updated for a specific period of time. Another one is a method of display in which a specific time is extracted from the XYT image and plots indicating information on changes in luminance are added to the XYT image space (hereinafter referred to as "plot-added XYT moving image").

The information processing apparatus 100 of the second embodiment performs display suitable for each of forward playback and reverse playback as follows. The specific clipping time is from time T1 (start time: first time) to time T2 (end time: second time).

<Frame Format Image>

Figure 7A:
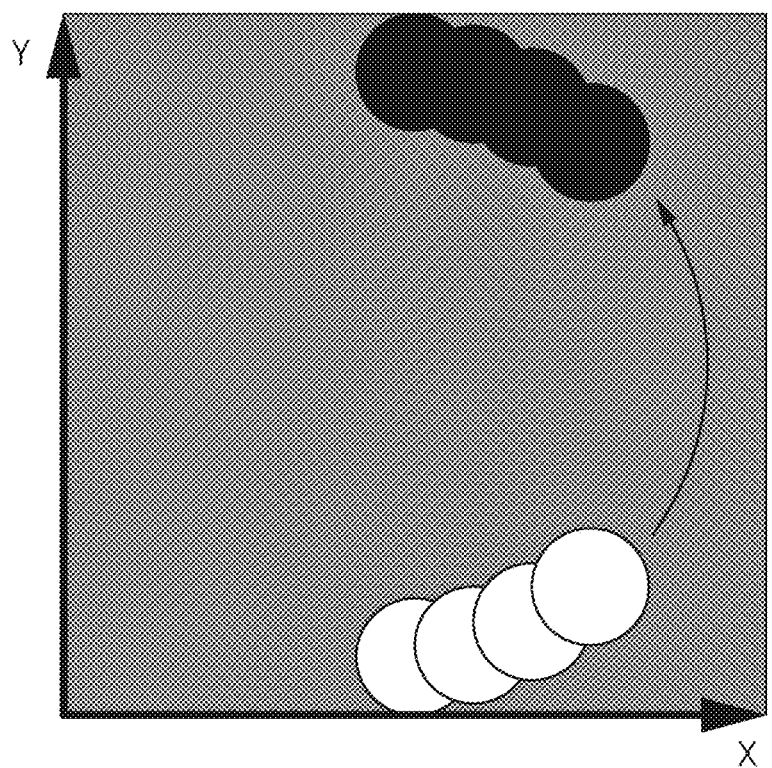
FIG. 7A is a diagram illustrating an example of display.
Figure 7B:
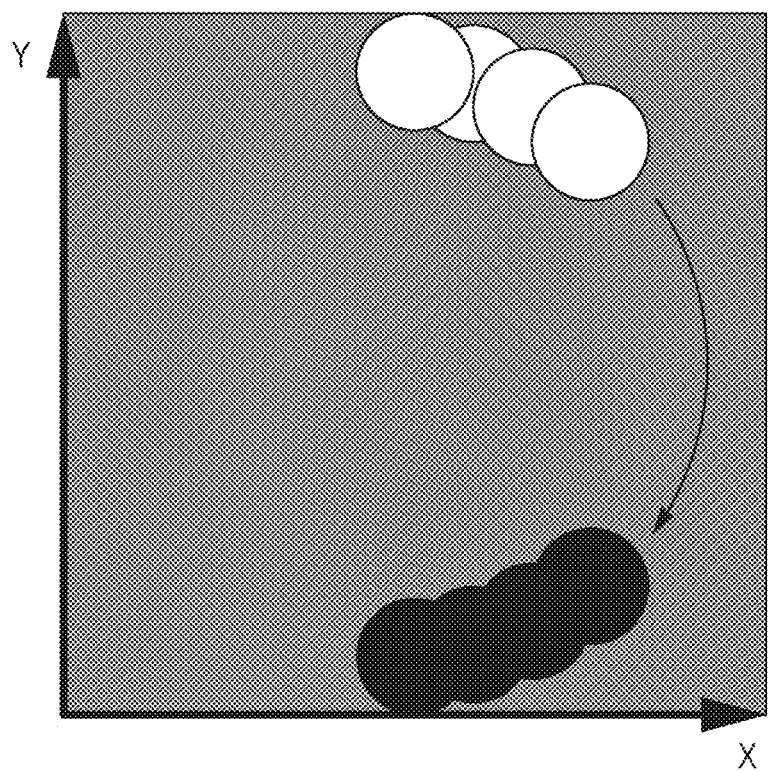
FIG. 7B is a diagram illustrating an example of display.

The image generation unit 202 generates a frame format image that displays information on the distribution of changes in luminance of the pixels integrated in a specific time range at some point in time. The display control unit 203 displays a frame format image at multiple points in time. FIG. 7A illustrates a frame format image generated from the forward playback image in FIG. 6A. FIG. 7B illustrates a frame format image generated from the reverse playback image in FIG. 6B. FIGS. 7A and 7B show the directions in which the subject moves at forward playback and reverse playback with arrows. As are seen from FIGS. 7A and 7B, the frame format image in which part of the reverse playback image is clipped displays the change in luminance of each pixel in reverse to that of the frame format image generated from the forward playback image.

In other words, the frame format image generated from the reverse playback image is displayed with the change in luminance of each pixel reversed, as the reverse XYT playback image is. Thus, the changes in luminance of each pixel displayed in the XYT image for looking down at the overall movement of the subject and in the frame format image in which detailed information of part of the XYT image match, thereby making it easy for the user to recognize the phenomenon occurring.

<Future Deleted Display>

Figure 8C:
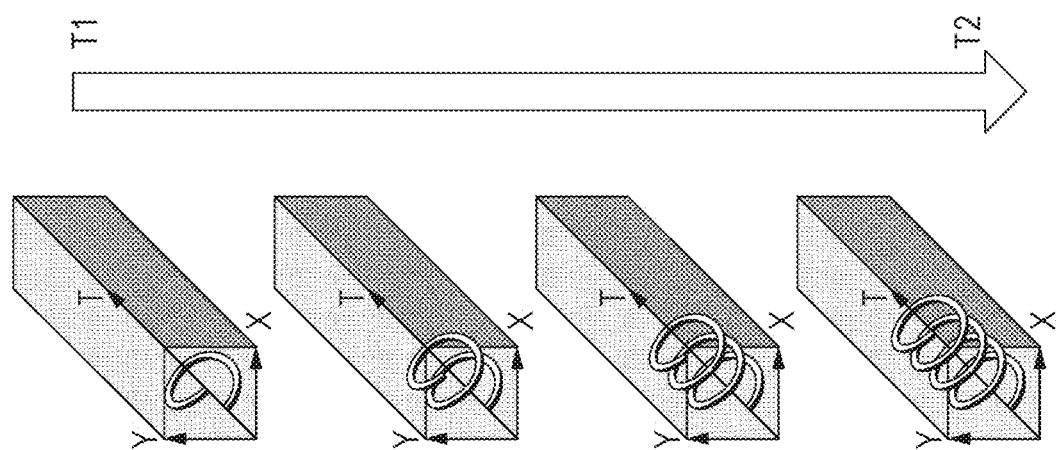
FIG. 8C is a diagram illustrating an example of display.
Figure 8B:
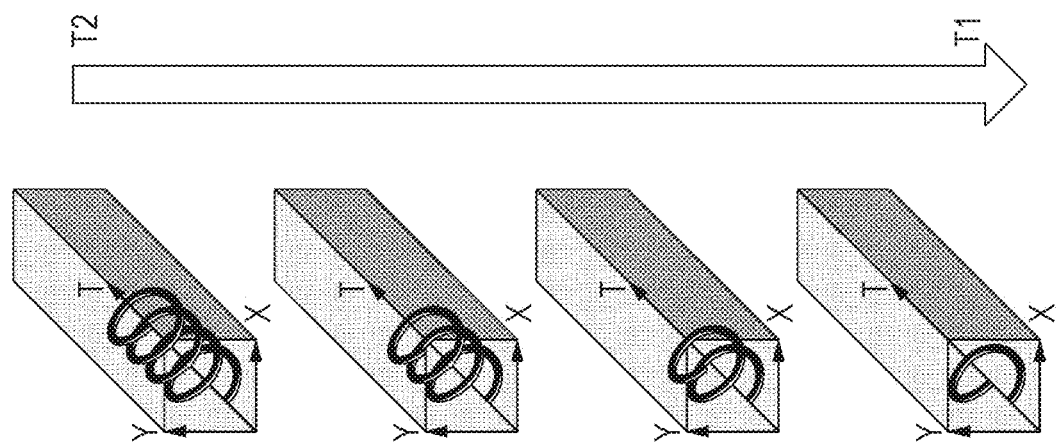
FIG. 8B is a diagram illustrating an example of display.
Figure 8A:
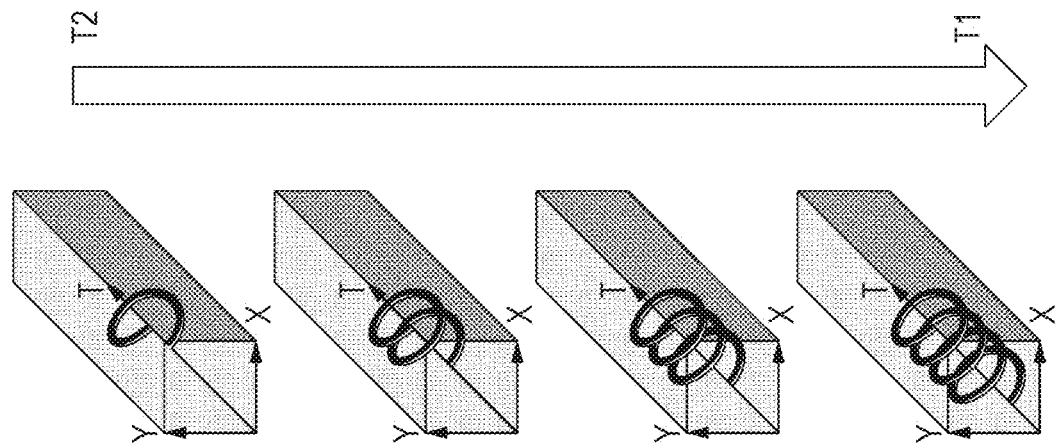
FIG. 8A is a diagram illustrating an example of display.

Plot images are generated in which pixels in which a change in luminance occurred at multiple points in time in a specific period are plotted in a coordinate space constituted by the first axis indicating the time axis and the second axes related to space. The generated plot images are displayed in a predetermined order by the display control unit 203. In displaying the plot images in reverse chronological order, all the plot images generated in the specific period are displayed, and thereafter the plot images generated at individual points in time are deleted in the order from the second time to the first time. In displaying the plot images in chronological order, the plot images generated at individual points in time are superposed and displayed in the order from the first time to the second time. FIG. 8A illustrates plot-added XYT moving images generated from the forward playback image in FIG. 4A. FIG. 8B illustrates plot-added XYT moving images generated from the reverse playback image in FIG. 6A. FIGS. 8A and 8B schematically show the plotting in chronological order to express the moving images.

FIG. 8A illustrates moving images in which luminance change information is gradually added as plots onto an XYT space from time T1, and finally at time T2, all luminance changes generated in the specific time from time T1 to time T2 are displayed on the XYT image. In other words, FIG. 8A illustrates moving images in which future luminance changes are gradually superposed on the past luminance changes. The use of such plot-added XYT moving images allows the user to easily grasp the causal relationship between a phenomenon generated at the time of interest and a phenomenon before it.

In contrast, FIG. 8B illustrates moving images starting from a state in which all the luminance change information generated from time T2 to time T1 are displayed on the XYT image, from which the plots of future luminance change information are gradually deleted in reverse chronological order. In other words, FIG. 8B illustrates moving images in which future changes in luminance are gradually deleted from the image in which all the luminance changes generated in the specific time are superposed. The use of plot-added XYT moving images beneficially makes it easy to, at reverse playback, grasp the causal relationship between a phenomenon occurring at the time of interest and a phenomenon that has occurred before that.

In other words, at forward playback, future luminance change information is gradually added to the past luminance change information, and at reverse playback, the future luminance change information is gradually deleted, with the past luminance change information left. This configuration beneficially makes it easy to grasp the causal relationship between a phenomenon generated at the time of interest and a phenomenon before it.

<Viewpoint in Future Deleted Display>

As shown in FIG. 8B, for the moving images in which luminance changes that occur after the present time are gradually deleted, the past may be displayed farther from the viewer, and the future may be displayed closer to the viewer. In contrast, for the moving images in which past luminance changes are gradually added to future luminance changes, the past may be displayed closer to the viewer, and the future may be displayed farther to the viewer, as shown in FIG. 8C.

In other words, the viewpoint may be changed to the opposite side about the time axis at reverse playback between a case in which future luminance change information is gradually deleted for display, with past luminance change information left, and a case in which past luminance changes are gradually added to the future luminance changes.

<Past Added Display>

FIG. 8B shows an example in which future luminance changes are gradually deleted to facilitate grasping the causal relationship between a phenomenon that occurred at the time of interest and a phenomenon that occurred before that. However, there may be a use case in which the cause of a phenomenon that occurred after the time of interest is to be ascertained. In this case, as shown in FIG. 8C, moving images in which luminance change information is gradually added from time T2 as plots onto the XYT space, and finally at time T1, all the luminance changes that occurred in the specific time from time T2 to time T1 are displayed on the XYT image may be displayed. In other words, moving images in which past luminance changes are gradually added to future luminance changes may be displayed.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computerreadable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-186564 filed Nov. 9, 2020, which is hereby incorporated by reference herein in its entirety.

What is claimed is:

1. An apparatus comprising:
   an acquisition unit configured to obtain a signal indicating an address of a pixel in which a change in luminance has occurred and time of the change; and
   a generation unit configured to generate a time-series image indicating a position of at least one pixel in which a change in luminance has occurred and a direction of the change in luminance based on the signal,
   wherein, when the time-series image is to be displayed in reverse chronological order, the generation unit generates the time-series image in which the direction of the change in luminance is reversed.

2. The apparatus according to claim 1, wherein, when the time-series is to be displayed, with the time series unchanged, the generation unit generates the time-series in which the direction of the change in luminance is unchanged.

3. The apparatus according to claim 1, wherein the generation unit generates the time-series image by converting the signal to a coordinate space constituted by a first axis indicating a time axis and second axes related to space.

4. The apparatus according to claim 3, wherein, when the time-series image is to be displayed in reverse chronological order, the generation unit generates the time-series image, with an origin of the first axis reversed or with an origin of the second axis unchanged.

5. The apparatus according to claim 1, further comprising:
   a control unit configured to control displaying the time-series image generated based on the signal output in a specific period from a first time that is a start time to a second time that is an end time.

6. The apparatus according to claim 5, wherein the control unit displays different images depending on whether the generated time-series image is displayed in reverse chronological order or in chronological order.

7. The apparatus according to claim 5,
   wherein the generation unit generates a frame format image indicating a change in luminance of each pixel at each point in time in a two-dimensional coordinate space constituted by second axes related to space based on the signal, and
   wherein the control unit superposes and displays frame format images at a plurality of points in time included in the specific period.

8. The apparatus according to claim 5,
   wherein the generation unit generates plot images that display a pixel where a change in luminance has occurred at a plurality of points in time included in the specific period in a coordinate space constituted by a first axis indicating a time axis and second axes related to space, and
   wherein the control unit displays the generated plot images at the plurality of point in time included in the specific period in a predetermined order.

9. The apparatus according to claim 8, wherein, when the plot images are to be displayed in reverse chronological order, the control unit displays all the plot images generated in the specific period and thereafter deletes the plot images generated at the individual points in time in order from the second time to the first time.

10. The apparatus according to claim 9, wherein the control unit displays the plot images, with an origin of the first axis indicating the time axis reversed.

11. The apparatus according to claim 8,
    wherein, when the plot images are to be displayed in chronological order, the control unit superposes and displays the plot images generated at the individual points in time in order from the first time to the second time, and
    wherein, when the plot images are to be displayed in reverse chronological order, the control unit superposes and displays the plot image generated at the individual points in time in order from the second time to the first time.

12. The apparatus according to claim 1, wherein the acquisition unit obtains the signal based on a sensor that outputs a signal according to a number of incident photons.

13. A non-transitory storage medium that stores a program for causing a computer to execute a method, the method comprising:
    obtaining a signal indicating an address of a pixel in which a change in luminance has occurred and time when the change occurred; and
    generating a time-series image indicating a change in luminance occurred in at least one pixel in a predetermined time range and a direction of the change in luminance based on the signal,
    wherein, when the time-series image is to be displayed in reverse chronological order, the time-series image is generated, with the direction of the change in luminance reversed.

14. The non-transitory storage medium according to claim 13, wherein, when the time-series image is to be displayed, with the time series unchanged, the generating generates the time-series image in which the direction of the change in luminance is unchanged.

15. The non-transitory storage medium according to claim 13, wherein the generating generates the time-series image by converting the signal to a coordinate space constituted by a first axis indicating a time axis and second axes related to space.

16. The non-transitory storage medium according to claim 13, further comprising:
displaying the time-series image generated based on the signal output in a specific period from a first time that is a start time to a second time that is an end time.

17. A method comprising:
obtaining a signal indicating an address of a pixel in which a change in luminance has occurred and time of the change; and
generating a time-series image indicating a change in luminance occurred in at least one pixel in a predetermined time range and a direction of the change in luminance based on the signal,
wherein, when the time-series image is to be displayed in reverse chronological order, the time-series image is generated, with the direction of the change in luminance reversed.

18. The method according to claim 17, wherein, when the time-series image is to be displayed, with the time series unchanged, the generating generates the time-series image in which the direction of the change in luminance is unchanged.

19. The method according to claim 17, wherein the generating generates the time-series image by converting the signal to a coordinate space constituted by a first axis indicating a time axis and second axes related to space.

20. The method according to claim 17, further comprising:
displaying the time-series image generated based on the signal output in a specific period from a first time that is a start time to a second time that is an end time.

* * * * *